(12) United States Patent
Boyer (10) Patent No.: US 7,591,186 B1
(45) Date of Patent: Sep. 22, 2009

(54) CONDUCTIVE SEALS AND METHOD FOR FABRICATING THE SAME

(75) Inventor: Gregory S. Boyer, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/120,824

(22) Filed: May 15, 2008

(51) Int. Cl.
*G01L 7/00* (2006.01)

(52) U.S. Cl. .......................................... 73/756

(58) Field of Classification Search ............ 73/700–756; 438/479
See application file for complete search history.

(56) References Cited

U.S. PATENT DOCUMENTS

| | | | |
|---|---|---|---|
| 5,351,550 A | 10/1994 | Maurer | 73/727 |
| 5,644,285 A * | 7/1997 | Maurer | 338/39 |
| 5,945,605 A * | 8/1999 | Julian et al. | 73/727 |
| 6,901,806 B2 | 6/2005 | Aizawa | 73/718 |
| 7,343,812 B2 * | 3/2008 | Stewart et al. | 73/756 |
| 2005/0034527 A1 | 2/2005 | Aizawa | 73/718 |
| 2007/0289387 A1 | 12/2007 | Stewart et al. | 73/717 |

OTHER PUBLICATIONS

Commercial Grade High Pressure Sensors-20PC Series, Sensing and Control, Honeywell.

* cited by examiner

*Primary Examiner*—Andre J Allen
(74) *Attorney, Agent, or Firm*—Kermit D. Lopez (57) ABSTRACT

A conductive seal comprises a central opening that can be disposed proximate to a lower surface of a diaphragm in a pressure sense die. A set of electrically conductive elements can be disposed directly over electrically conductive bonding pads on the pressure sense die in such a manner that a number of electrically molded leads can be in electrical contact with the pressure sense die. A set of electrically insulating elements can be placed adjacent to the conductive elements. The conductive elements can be located away from edges of the conductive seal, towards the central opening of the conductive seal without minimizing the insulation between the central opening and the conductive elements of the seal. Therefore, the conductive seal can prevent the pressure sense die and other electrical circuitry from die-edge shorting in order to achieve long-term sensor reliability and performance.

20 Claims, 5 Drawing Sheets

CONDUCTIVE SEALS AND METHOD FOR FABRICATING THE SAME

TECHNICAL FIELD

Embodiments are generally related to pressure sensors. Embodiments are also related to elastomeric conductive seals utilized in the context of pressure sensors. Embodiments are additionally related to the fabrication of elastomeric conductive seals.

BACKGROUND OF THE INVENTION

Pressure sensors are utilized in a wide range of sensing applications. For such applications, differential, gauge and absolute pressure sensors may accurately sense the pressure of a liquid or gaseous media. Each of these pressure sensors can be configured utilizing semiconductor technology. One of the most common types of pressure sensors is solid-state silicon pressure sensors. Such pressure sensors may incorporate a pressure sense die to exhibit a high degree of sensing accuracy. The pressure sense die provides an electrical output in response to an applied stress or pressure. The pressure sensors also can include one or two pressure ports, through which the media passes.

Some pressure sensors utilize a conductive elastomeric seal for electrically connecting a number of electrical terminals or molded-in leads to the pressure sense die. The pressure sense die can be sandwiched and compressed between an elastomeric media seal and conductive elastomeric seals contained within a plastic housing without significantly changing the output of the pressure sense die due to applied stress. These conductive seals may include two parallel, laminated conductor and insulator strips, which run from one side to the other side. Such a pressure sensor design allows the conductive seal to be slightly offset relative to the pressure sense die in the plastic housing due to manufacturing tolerances. The conductive seals can be compressed against the sense die in order to construct a pneumatic seal and effective electrical connection over the operating pressure and temperature range of the pressure sensor.

The elastomeric seals are conductive in certain precisely-determined regions so as to connect signals from the pressure sense die to the electrical terminals, which exit the housing of the pressure sensor. The conductive seals may, however, cause an electrical short if the conductor or insulator bands are forced over the edge of the pressure sense die, because the pressure sense die typically constitutes a semiconductor. In particular, electrical shorting occurs when the conductive seals wrap over the edge of the pressure sense die. The electrical shorting may short out a Wheatstone bridge or other electronic circuitry located on the sensor package such that it changes the sensor output intermittently. This intermittent sense output is difficult to detect during manufacturing and results in "die-edge shorting" in the pressure sensors.

In the majority of prior art pressure sensors, the elastomeric seals exhibit an inherent electrical shorting problem with the pressure sense die if perfect alignment is not held when the package is snapped together and the seals are compressed. The conductive seals may wrap over the edge of the pressure sense die, since the pressure sense die is slightly smaller than the package housing in order to fit the pressure sense die into the housing due to manufacturing tolerances. Therefore, die-edge shorting may occur when the pressure sense die is compressed against the seals, which can lead to a sensor malfunction or failure. Hence, it is desirable to prevent the sensing die, circuitry and electrical connections from exposure to die-edge shorting in order to ensure reliable operation of the pressure sensor.

Moreover, some current seal designs are constructed by bonding together a series of laminations of conductors and insulators utilizing adhesives, in addition to the use of a punching operation to form the hole and a slicing operation to construct individual parts. These operations can result in poorly formed parts and components that occasionally fail to meet dimensional specifications. Therefore, the pressure sensors should be constructed in such a manner that it enables the sensor parts to meet proper dimensional specifications.

A need, therefore, exists for an improved conductive seal, which achieves the elimination of die-edge shorting and which is ultimately more efficient and sturdier than presently implemented pressure sensors. Such conductive seals are described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved conductive seal utilized in the context of pressure sensors.

It is another aspect of the present invention to provide for a method for fabricating a conductive seal.

The aforementioned aspects and other objectives and advantages can now be achieved as described herein. A conductive seal includes a central opening that can be disposed proximate to a lower surface of a diaphragm in a pressure sense die. A set of conductive elements can be disposed directly over electrically conductive bonding pads on the pressure sense die in such a manner that a number of metal leads molded in a housing can be in electrical contact with the pressure sense die. These conductive elements should be surrounded by an elastomeric insulator and can be located away from edges of the conductive seal, towards the central opening of the conductive seal without minimizing the insulation between the central opening and the conductive elements of the seal. Therefore, the conductive seal can prevent the pressure sense die and other electrical circuitry from die-edge shorting in order to achieve long-term reliability and performance of a pressure sensor.

Furthermore, the conductive seal can be injection molded with conductive elements inserted into a mold and an elastomer molded around these elements. Such injection molding results in an enhanced sensor part formation and an increased capability of meeting the dimensional tolerances. The conductive seal can be disposed between the pressure sense die and a plastic housing, wherein the conductive seal is selectively conductive and resilient.

Additionally, the conductive seal can be slightly offset relative to the pressure sense die in the plastic housing due to manufacturing tolerances. The seal and the pressure sense die can be compressed therebetween in order to make a pneumatic seal and provide an effective electrical connection over the operating pressure and temperature range of the pressure sensor. The conductive elements of the seal can be symmetrically located in such a manner that a pressure sensor package is assembled in several orientations thus simplifying the sensor manufacturing process. The conductive elements of the seal can be designed in various shapes in accordance with design considerations.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
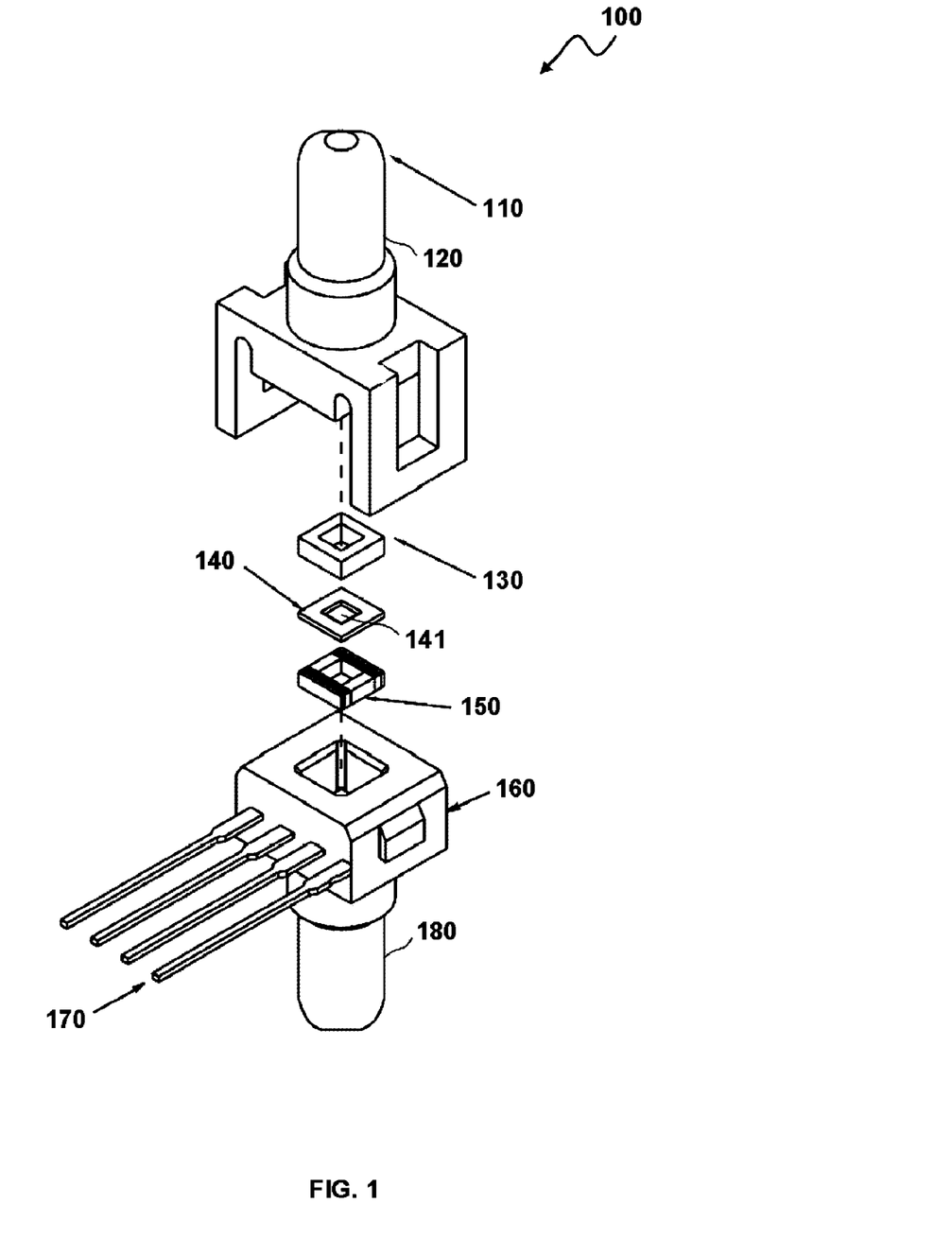
FIG. 1 illustrates a detailed and exploded view of a pressure sensor, in which embodiments of the present invention may be implemented.

Referring to FIG. 1, a detailed and exploded view of a pressure sensor 100 is illustrated, in which embodiments of the present invention may be implemented. The pressure sensor 100 can be designed utilizing semiconductor technology. The pressure sensor 100 can include one or two pressure ports (either 120 and/or 180) for allowing media to pass through therein. The two pressure ports 120 and 180 can be preferably configured from a metal or plastic material. The two pressure ports 120 and 180 can be incorporated with a metal or plastic cover 110. Note that in FIGS. 1-8 identical or similar parts or elements are generally indicated by identical reference numerals.

A silicon pressure sense die 140 can be pneumatically sealed to the pressure port 120 by compressing a media seal 130 between the pressure sense die and the pressure port. Similarly, a silicon pressure sense die 140 can be pneumatically sealed to the housing port 180 by compressing a conductive seal 150 between the pressure sense die and the housing port. The difference between pressures in each pressure ports 120 and 180 can be sensed by passing the media up to the pressure sense die 140. The pressure sense die 140 can include a diaphragm 141 and multiple electrically conductive bonding pads (not shown) therein. The diaphragm 141 can be made of thin silicon materials in order to respond by deforming in proportion to even very minute media pressure. The electrically conductive bonding pads can be electrically connected to the diaphragm 141 in order to output electrical signals.

Furthermore, the diaphragm 141 can be incorporated with piezoresistive elements (not shown) that convert the deformation of the diaphragm 141 due to the applied pressure into an electrical output (utilizing well-known piezoresistive principles) that is proportional to the applied pressure. The bonding pads of the pressure sense die 140 can be integrated on the piezoresistive elements. The pressure sense die 140 can further be in electrical contact with a conductive seal 150 in order to continue the electrical connection to several external electrical terminals or molded-in leads 170. The media seal 130, the pressure sense die 140 and the conductive seal 150 can be incorporated into a metal or plastic housing 160, into which the electrical terminals or leads 170 can be molded. Such a pressure sensor assembly 100 can provide an accurate output signal.

Figure 2:
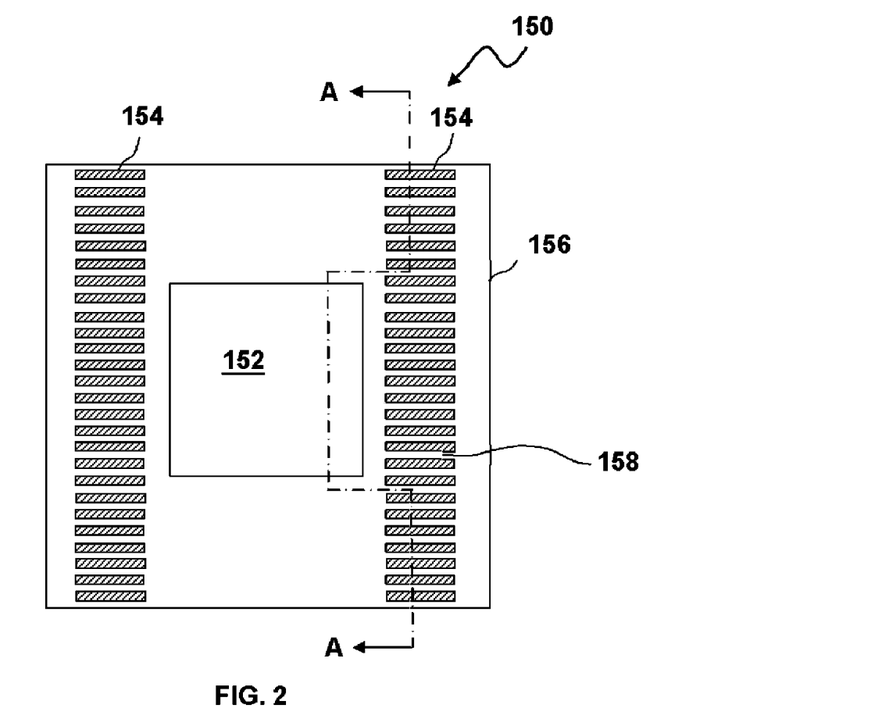
FIG. 2 illustrates an enlarged view of a conductive seal as shown in FIG. 1, in accordance with the present embodiment.
Figure 3:
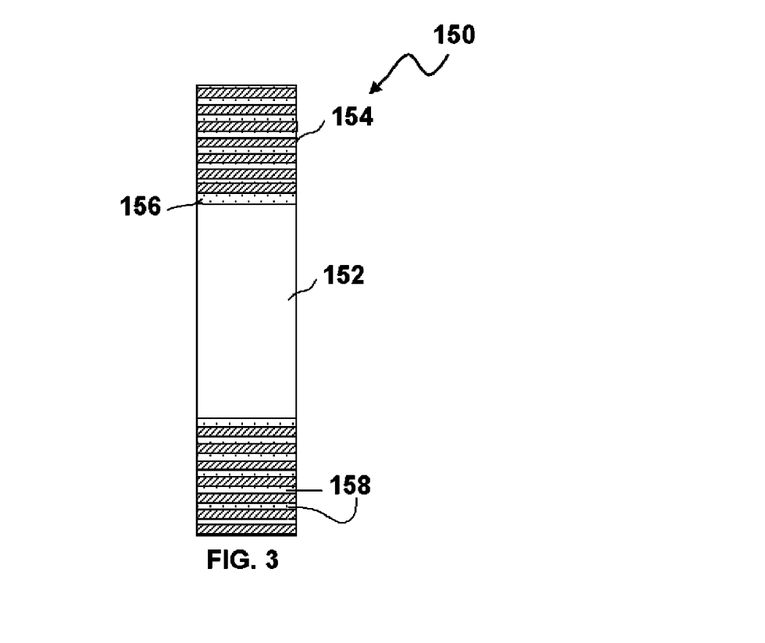
FIG. 3 illustrates a cross-sectional view of the conductive seal as shown in FIG. 2 along line A-A, in accordance with the present embodiment.

Referring to FIG. 2, an enlarged view of a conductive seal 150, as shown in FIG. 1, is illustrated, in accordance with the present embodiment. The conductive seal 150 comprises a central opening 152, a set of parallel, laminated conductor strips 154, and a set of parallel, laminated insulator strips 158. FIG. 3 illustrates a cross-sectional view of the conductive seal 150 along line A-A in FIG. 2. The conductive strips 154 can be made of an elastomeric material, (i.e. elastomer 156), intermixed with conductive particles. The central opening 152 can be disposed proximate to a lower surface of the diaphragm 141 in the pressure sense die 140, as shown in FIG. 1. The central opening 152 can be provided for allowing a liquid or gaseous media to pass through. The dimensional manufacturing and assembly tolerances in this present design make it possible for the die-edge shorting condition described previously to occur.

Figure 4:
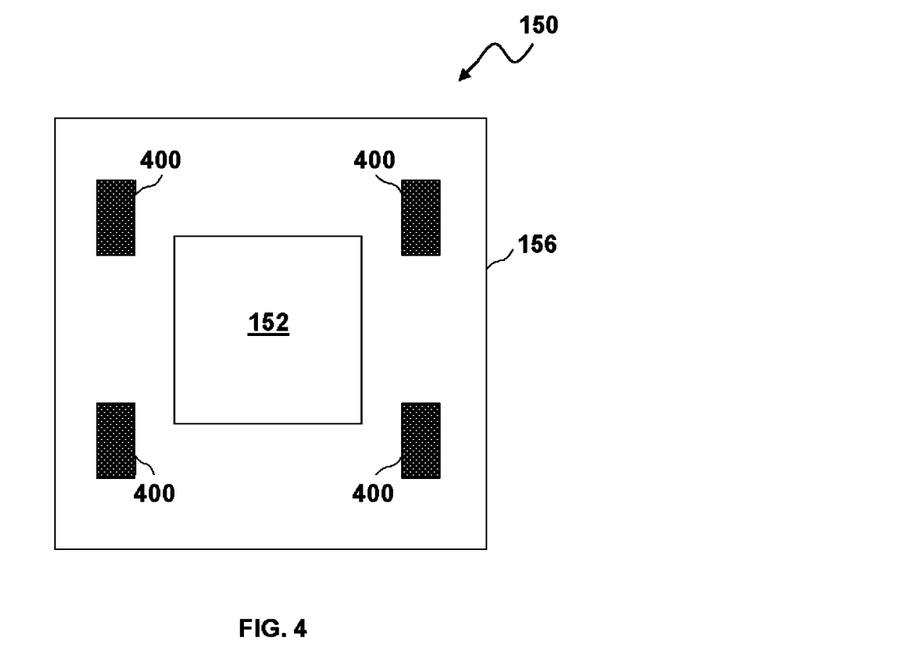
FIG. 4 illustrates an enlarged view of the conductive seal with rectangular-shaped conductive elements, in accordance with a preferred embodiment.

Referring to FIG. 4, an enlarged view of the conductive seal 150, as shown in FIG. 1, is illustrated, in accordance with a preferred embodiment. The conductive seal 150 can be disposed between the pressure sense die 140 and the housing 160, where the conductive seal 150 is selectively conductive and resilient. This conductive seal comprises a set of rectangular-shaped conductive elements 400. The conductive seal 150 can be incorporated with several conductive elements 400 based on design requirements. The conductive elements 400 can be disposed directly over the electrically conductive bonding pads (not shown) on the pressure sense die 140 in such a manner that a number of electrically molded leads 170 can be in electrical contact with the pressure sense die 140.

The central opening 152 can be disposed proximate to a lower surface of the diaphragm 141 in the pressure sense die 140, as shown in FIG. 1. The central opening 152 can be provided for allowing a liquid or gaseous media to pass through. The rectangular-shaped conductive elements 400 can be positioned at each corner of the conductive seal 150 with a specific distance away from the edges of the seal 150, which provides sufficient sealing effect between the pressure sense die 140 and the seal 150. Such conductive seal 150 with the rectangular-shaped conductive elements 400 can seal the pressure sense die 140 and other electronic circuits to protect the pressure sense die 140 from die-edge shorting.

The rectangular-shaped conductive elements 400 can be symmetrically located in such a manner that the pressure sensor package 100 can be assembled in several orientations. The conductive seal 150 can be slightly offset relative to the pressure sense die 140 in the plastic housing 160 due to manufacturing tolerances. The seal 150 and the pressure sense die 140 can be compressed therebetween in order to make a pneumatic seal and effective electrical connection over the operating pressure and temperature range. Such compressive force can provide appropriate pressure between the pressure sense die 140 and the seal 150 to maintain electrical communication between the bonding pads of the pressure sense die 140 and the rectangular-shaped conductive elements 400 of the seal 150.

The conductive seal 150 can be injection molded with the rectangular-shaped conductive elements 400 inserted into a mold and an elastomer 156 can be molded around the seal 150. Such injection molding results in better sensor part formation and higher capability of meeting the dimensional tolerances.

These geometrical shapes of the conductive elements 400 are described for purposes of clarity and specificity; however, they should not be interpreted in any limiting way. Other shapes are also possible. However, it will be apparent to those skilled in the art that the geometrical shapes can be changed without departing from the scope of the invention.

Note that in FIGS. 1-8, identical or similar parts or elements are generally indicated by identical reference numerals.

Figure 5:
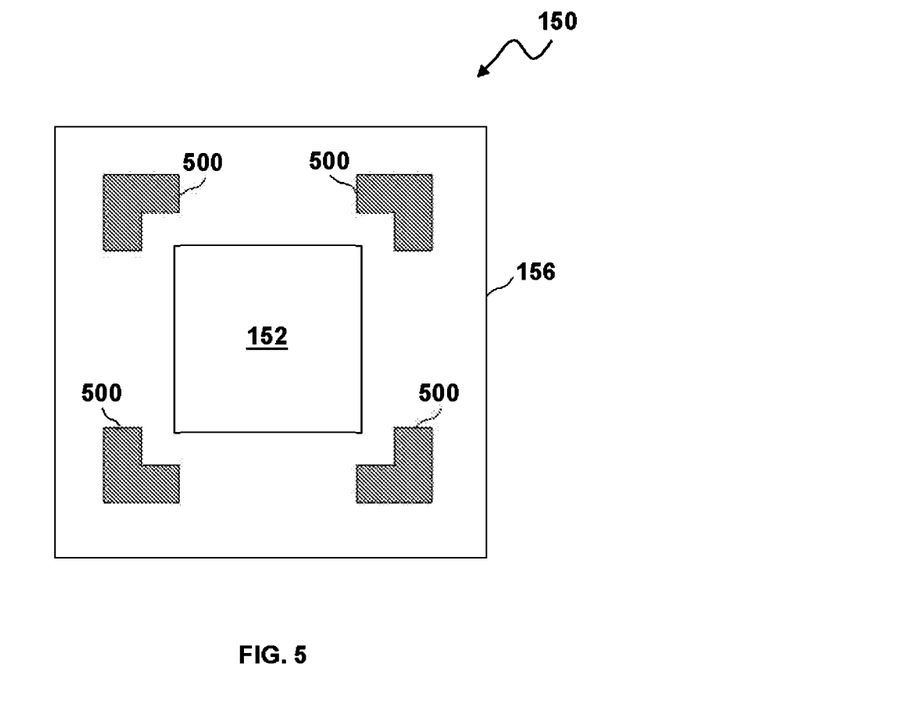
FIG. 5 illustrates an enlarged view of the conductive seal with L-shaped conductive elements, in accordance with an alternative embodiment.

Referring to FIG. 5, an enlarged view of the conductive seal 150 with L-shaped conductive elements 500 is illustrated, in accordance with an alternative embodiment. The conductive seal 150 can be disposed between the pressure sense die 140 and the housing 160, where the conductive seal 150 is selectively conductive and resilient. This conductive seal comprises a set of L-shaped conductive elements 500. The conductive seal 150 can be incorporated with several conductive elements 500 based on design requirements. The conductive elements 500 can be disposed directly over the electrically conductive bonding pads (not shown) on the pressure sense die 140 in such a manner that a number of electrically molded leads 170 can be in electrical contact with the pressure sense die 140.

The central opening 152 can be disposed proximate to a lower surface of the diaphragm 141 in the pressure sense die 140, as shown in FIG. 1. The central opening 152 can be provided for allowing a liquid or gaseous media to pass through. The L-shaped conductive elements 500 can be positioned at each corner of the conductive seal 150 with a specific distance away from the edges of the seal 150, which provides sufficient sealing effect between the pressure sense die 140 and the seal 150. Such conductive seal 150 with the L-shaped conductive elements 500 can seal the pressure sense die 140 and other electronic circuits to protect the pressure sense die 140 from die-edge shorting.

The L-shaped conductive elements 500 can be symmetrically located in such a manner that the pressure sensor package 100 can be assembled in several orientations. The conductive seal 150 can be slightly offset relative to the pressure sense die 140 in the plastic housing 160 due to manufacturing tolerances. The seal 150 and the pressure sense die 140 can be compressed therebetween in order to make a pneumatic seal and effective electrical connection over the operating pressure and temperature range. Such compressive force can provide appropriate pressure between the pressure sense die 140 and the seal 150 to maintain electrical communication between the bonding pads of the pressure sense die 140 and the L-shaped conductive elements 500 of the seal 150. The conductive seal 150 can be injection molded with the L-shaped conductive elements 500 inserted into a mold and an elastomer 156 can be molded around the seal 150.

Figure 6:
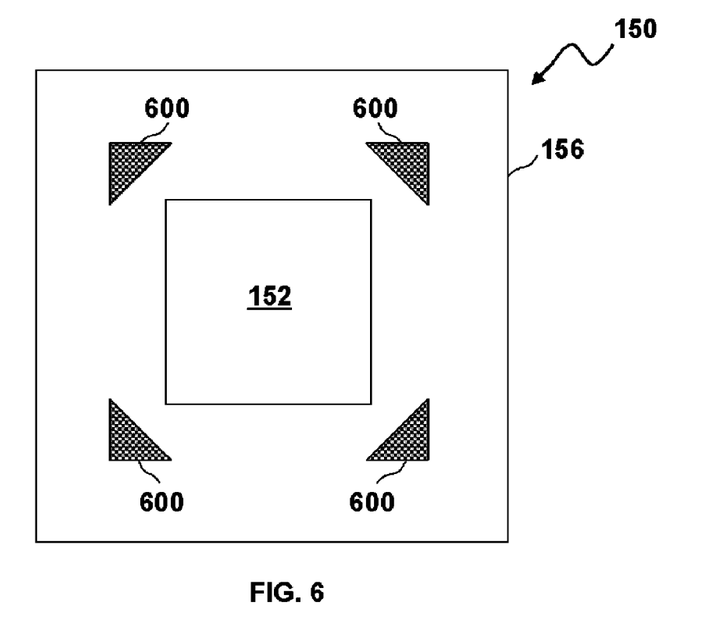
FIG. 6 illustrates an enlarged view of the conductive seal with triangular-shaped conductive elements, in accordance with an alternative embodiment.

Referring to FIG. 6, a schematic perspective view of the conductive seal 150 with triangular-shaped conductor strips 600 is illustrated, in accordance with an alternative embodiment. The conductive seal 150 can be disposed between the pressure sense die 140 and the housing 160, where the conductive seal 150 is selectively conductive and resilient. This conductive seal comprises a set of triangular-shaped conductive elements 600. The conductive seal 150 can be incorporated with several conductive elements 600 based on design requirements. The conductive elements 600 can be disposed directly over the electrically conductive bonding pads (not shown) on the pressure sense die 140 in such a manner that a number of electrically molded leads 170 can be in electrical contact with the pressure sense die 140.

The central opening 152 can be disposed proximate to a lower surface of the diaphragm 141 in the pressure sense die 140, as shown in FIG. 1. The central opening 152 can be provided for allowing a liquid or gaseous media to pass through. The triangular-shaped conductive elements 600 can be positioned at each corner of the conductive seal 150 with a specific distance away from the edges of the seal 150, which provides sufficient sealing effect between the pressure sense die 140 and the seal 150. Such conductive seal 150 with the triangular-shaped conductive elements 600 can seal the pressure sense die 140 and other electronic circuits to protect the pressure sense die 140 from die-edge shorting.

The triangular-shaped conductive elements 600 can be symmetrically located in such a manner that the pressure sensor package 100 can be assembled in several orientations. The conductive seal 150 can be slightly offset relative to the pressure sense die 140 in the plastic housing 160 due to manufacturing tolerances. The seal 150 and pressure the sense die 140 can be compressed therebetween in order to make a pneumatic seal and effective electrical connection over the operating pressure and temperature range. Such compressive force can provide appropriate pressure between the pressure sense die 140 and the seal 150 to maintain electrical communication between the bonding pads of the pressure sense die 140 and the triangular-shaped conductive elements 600 of the seal 150. Note that the conductive seal 150 can be injection molded with the triangular-shaped conductive elements 600 inserted into a mold and an elastomer 156 can be molded around the seal 150.

Figure 7:
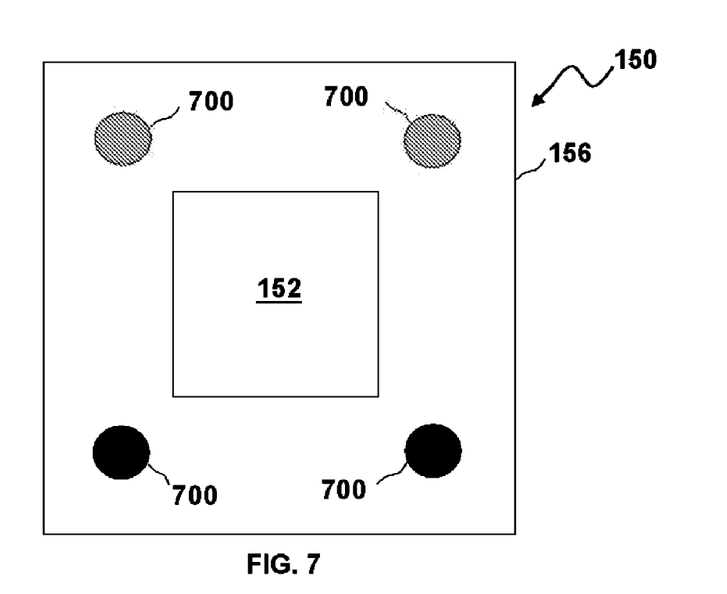
FIG. 7 illustrates an enlarged view of the conductive seal with circular conductive elements, in accordance with an alternative embodiment.

Referring to FIG. 7, an enlarged view of the conductive seal 150 with circular-shaped conductive elements 700 is illustrated, in accordance with an alternative embodiment. The conductive seal 150 can be disposed between the pressure sense die 140 and the housing 160, where the conductive seal 150 is selectively conductive and resilient. This conductive seal comprises a set of circular-shaped conductive elements 700. The conductive seal 150 can be incorporated with several conductive elements 700 based on design requirements. The conductive elements 700 can be disposed directly over the electrically conductive bonding pads (not shown) on the pressure sense die 140 in such a manner that a number of electrically molded leads 170 can be in electrical contact with the pressure sense die 140.

The central opening 152 can be disposed proximate to a lower surface of the diaphragm 141 in the pressure sense die 140, as shown in FIG. 1. The central opening 152 can be provided for allowing a liquid or gaseous media to pass through. The circular-shaped conductive elements 700 can be positioned at each corner of the conductive seal 150 with a specific distance away from the edges of the seal 150, which provides sufficient sealing effect between the pressure sense die 140 and the seal 150. Such conductive seal 150 with the circular-shaped conductive elements 700 can seal the pressure sense die 140 and other electronic circuits to protect the pressure sense die 140 from die-edge shorting.

The circular-shaped conductive elements 700 can be symmetrically located in such a manner that the pressure sensor package 100 can be assembled in several orientations. The conductive seal 150 can be slightly offset relative to the pressure sense die 140 in the plastic housing 160 due to manufacturing tolerances. The seal 150 and pressure the sense die 140 can be compressed therebetween in order to make a pneumatic seal and effective electrical connection over the operating pressure and temperature range. Such compressive force can provide appropriate pressure between the pressure sense die 140 and the seal 150 to maintain electrical communication between the bonding pads of the pressure sense die 140 and the circular-shaped conductive elements 700 of the seal 150.

The conductive seal 150 can be injection molded with the circular-shaped conductive elements 700 inserted into a mold and an elastomer 156 can be molded around the seal 150.

Figure 8:
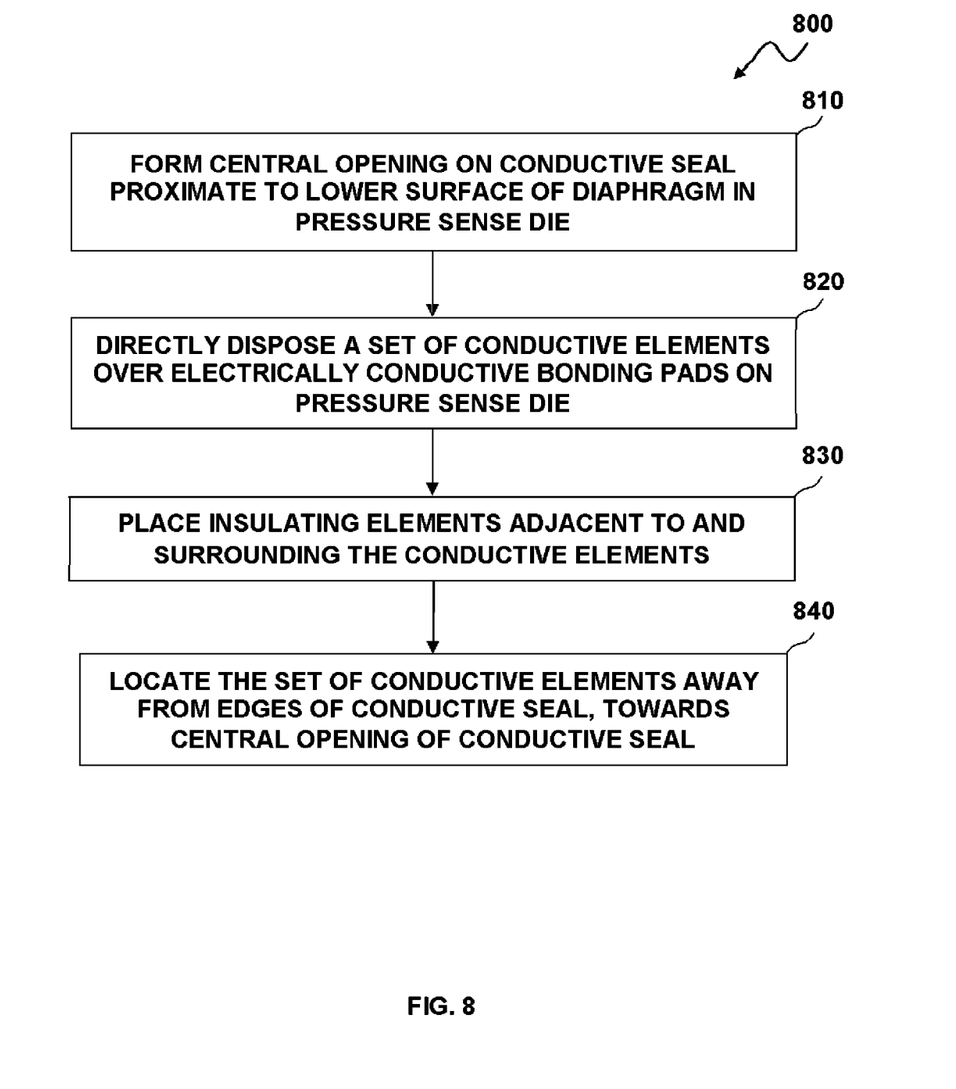
FIG. 8 illustrates a flow chart illustrative of a method for fabricating the conductive seal, in accordance with an alternative embodiment.

Referring to FIG. 8, a flow chart illustrative of a method 800 for fabricating the conductive seal 150 is illustrated, in accordance with an alternative embodiment. As illustrated at block 810, a central opening 152 can be formed on the conductive seal 150 proximate to a lower surface of a diaphragm 141 in a pressure sense die 140. As indicated at block 820, a set of conductive elements 154 can be disposed directly over electrically conductive bonding pads on the pressure sense die 140 in such a manner that a number of electrical terminals 170 can be in electrical contact with the pressure sense die 140.

Thereafter, as described at block 830, insulating elements 156 can be placed adjacent to and surrounding the conductive elements 154. Finally, as depicted at block 840, the set of conductive elements 154 can be located in the corners away from edges of the conductive seal 150, towards the central opening 152 of the conductive seal 150 without minimizing the insulation between the central opening 152 and the conductive elements 154 of the seal 150. Hence, the conductive seal 150 can prevent die-edge shorting with the pressure sense die 140 and other electrical circuitry, which enables a long-term reliability of the pressure sensor 100.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A conductive seal for a pressure sensor, comprising:
   at least one central opening disposed proximate to a lower surface of a diaphragm, wherein said diaphragm is centrally placed on a pressure sense die;
   a plurality of conductive elements disposed directly over a plurality of electrically conductive bonding pads on said pressure sense die in such a manner that a plurality of electrically molded leads is in electrical contact with said pressure sense die; and
   a plurality of electrically insulating elements placed adjacent to and surrounding said plurality of conductive elements, wherein said plurality of conductive elements is located away from edges of a conductive seal, towards said at least one central opening of said conductive seal, thereby preventing die-edge shorting between said conductive seal and said pressure sense die.

2. The conductive seal of claim 1 wherein said conductive seal is injection molded with said plurality of conductive elements inserted into a mold.

3. The conductive seal of claim 1 wherein said conductive seal comprises an elastomer mold thereon.

4. The conductive seal of claim 1 wherein said conductive seal is compressed against said pressure sense die to provide a pneumatic seal and an enhanced electrical connection between said pressure sense die and said plurality of electrically molded leads.

5. The conductive seal of claim 1 wherein said plurality of conductive elements is symmetrically located in such a manner that a pressure sensor package is capable of being assembled in several orientations.

6. The conductive seal of claim 1 wherein:
   said conductive seal is compressed against said pressure sense die to provide a pneumatic seal and an enhanced electrical connection between said pressure sense die and said plurality of electrically molded leads; and
   said plurality of conductive elements is symmetrically located in such a manner that a pressure sensor package is capable of being assembled in several orientations.

7. The conductive seal of claim 1 wherein said plurality of conductive elements comprises a cross-sectional shape selected from a group comprising at least one of the following shapes: a rectangle shape, an L-shape, a triangular shape, and a circular shape.

8. A conductive seal for a pressure sensor, comprising:
   at least one central opening disposed proximate to a lower surface of a diaphragm, wherein said diaphragm is centrally placed on a pressure sense die;
   a plurality of conductive elements disposed directly over a plurality of electrically conductive bonding pads on said pressure sense die in such a manner that a plurality of electrically molded leads is in electrical contact with said pressure sense die;
   a plurality of electrically insulating elements placed adjacent to and surrounding said plurality of conductive elements, wherein said plurality of conductive elements is located away from edges of a conductive seal, towards said at least one central opening of said conductive seal, thereby preventing die-edge shorting between said conductive seal and said pressure sense die; and
   a pneumatic seal, wherein said conductive seal is compressed against said pressure sense die to provide said pneumatic seal and an enhanced electrical connection between said pressure sense die and said plurality of electrically molded leads.

9. The conductive seal of claim 8 wherein said conductive seal is injection molded with said plurality of conductive elements inserted into a mold.

10. The conductive seal of claim 8 wherein said conductive seal comprises an elastomer mold thereon.

11. The conductive seal of claim 8 wherein said conductive seal is injection molded with said plurality of conductive elements inserted into a mold comprising an elastomer material.

12. The conductive seal of claim 8 wherein said plurality of conductive elements is symmetrically located in such a manner that a pressure sensor package is capable of being assembled in several orientations.

13. The conductive seal of claim 8 wherein said plurality of conductive elements comprises a cross-sectional shape selected from a group comprising at least one of the following shapes: a rectangle shape, an L-shape, a triangular shape, and a circular shape.

14. A method of forming a conductive seal for a pressure sensor, comprising:
   disposing at least one central opening proximate to a lower surface of a diaphragm centrally placed on a pressure sense die;

locating a plurality of conductive elements directly over a plurality of electrically conductive bonding pads on said pressure sense die in such a manner that a plurality of electrically molded leads is in electrical contact with said pressure sense die; and placing a plurality of electrically insulating elements adjacent to and surrounding said plurality of conductive elements, wherein said plurality of conductive elements is located away from edges of a conductive seal, towards said at least one central opening of said conductive seal, thereby preventing die-edge shorting between said conductive seal and said pressure sense die.

15. The method of claim 14 further comprising injection molding said conductive seal with said plurality of conductive elements inserted into a mold.

16. The method of claim 14 wherein said conductive seal comprises an elastomer mold thereon.

17. The method of claim 14 further comprising compressing said conductive seal against said pressure sense die to provide a pneumatic seal and an enhanced electrical connection between said pressure sense die and said plurality of electrically molded leads.

18. The method of claim 14 further comprising symmetrically locating said plurality of conductive elements in such a manner that a pressure sensor package thereof is capable of being assembled in several orientations.

19. The method of claim 14 further comprising:
compressing said conductive seal against said pressure sense die to provide a pneumatic seal and an enhanced electrical connection between said pressure sense die and said plurality of electrically molded leads; and
symmetrically locating said plurality of conductive elements in such a manner that a pressure sensor package is capable of being assembled in several orientations.

20. The method of claim 14 further comprising selecting said plurality of conductive elements to comprise a cross-sectional shape selected from a group comprising at least one of the following shapes: a rectangle shape, an L-shape, a triangular shape, and a circular shape.

* * * * *